(12) United States Patent
Popat et al.

(10) Patent No.: US 12,554,518 B2
(45) Date of Patent: Feb. 17, 2026

(54) SMART INPUT DEVICES WITH USER BEHAVIOR PREDICTIONS

(71) Applicant: Dell Products L.P., Round Rock, TX (US)

(72) Inventors: Rajiv Popat, Kolkata (IN); Bijan Kumar Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/365,508

(22) Filed: Aug. 4, 2023

(65) Prior Publication Data

US 2025/0045081 A1 Feb. 6, 2025

(51) Int. Cl.
*G06F 9/451* (2018.01)

(52) U.S. Cl.
CPC .................................. *G06F 9/453* (2018.02)

(58) Field of Classification Search
CPC ..................................................... G06F 9/453
See application file for complete search history.

(56) References Cited

U.S. PATENT DOCUMENTS

| | | | | |
|---|---|---|---|---|
| 10,430,054 B2* | 10/2019 | Andersson | .......... | G06F 3/04886 |
| 10,732,964 B2* | 8/2020 | Krishnappa | ........... | G06F 16/907 |
| 10,853,867 B1* | 12/2020 | Bulusu | ............... | G06Q 30/0631 |
| 11,017,764 B1* | 5/2021 | Das | .................. | G06F 16/24578 |
| 11,301,761 B2* | 4/2022 | Krishnamurthy | ...... | G06Q 30/00 |
| 11,475,053 B1* | 10/2022 | Das | ..................... | G06F 16/3322 |
| 11,537,494 B2* | 12/2022 | Zotto | .................. | G06F 11/3438 |
| 11,710,064 B2* | 7/2023 | P K | ..................... | G06F 11/3447 706/12 |
| 11,997,177 B1* | 5/2024 | Seyeditabari | ......... | H04L 67/535 |
| 12,099,816 B2* | 9/2024 | Jalaluddin | ............. | G06F 40/295 |
| 2010/0241507 A1* | 9/2010 | Quinn | ................ | G06Q 30/0256 705/14.42 |
| 2012/0278179 A1* | 11/2012 | Campbell | .......... | G06Q 30/0255 705/14.69 |
| 2016/0360382 A1* | 12/2016 | Gross | .................. | G06F 3/04186 |
| 2018/0260718 A1* | 9/2018 | Biswas | .................... | G06F 40/20 |
| 2018/0322205 A1* | 11/2018 | Balaraman | ............ | G06F 40/134 |
| 2018/0365025 A1* | 12/2018 | Almecija | .............. | G06F 3/0482 |
| 2019/0260841 A1* | 8/2019 | Roberts | ................ | H04L 67/535 |
| 2020/0125586 A1* | 4/2020 | Rezaeian | ................ | G06F 3/048 |
| 2022/0138795 A1* | 5/2022 | Siddiqui | .................. | G06N 7/01 705/14.45 |
| 2023/0080553 A1* | 3/2023 | Dharmasiri | ........... | G10L 15/063 704/231 |
| 2023/0095673 A1* | 3/2023 | Dharmasiri | ............ | G06V 10/82 382/157 |
| 2023/0154455 A1* | 5/2023 | Vu | ....................... | G10L 15/1815 704/243 |

(Continued)

*Primary Examiner* — Tadesse Hailu
(74) *Attorney, Agent, or Firm* — Workman Nydegger

(57) ABSTRACT

One example method includes detecting an operation of an input device, obtaining a clickstream associated with a user, using information from the clickstream, generating a prediction as to a next action by the user using the input device, and presenting the prediction to the user for possible selection by the user. Selection of the prediction by the user eliminates the need for the user to perform input device manipulations that would otherwise be required if the prediction were not selected.

18 Claims, 12 Drawing Sheets

(56) References Cited

U.S. PATENT DOCUMENTS

| | | | |
|---|---|---|---|
| 2023/0206125 A1* | 6/2023 | Pham | G06N 5/01 |
| | | | 704/9 |
| 2023/0315491 A1* | 10/2023 | Brdiczka | G06F 9/451 |
| 2024/0095802 A1* | 3/2024 | Ranganathan | G06Q 30/0631 |
| 2024/0231607 A1* | 7/2024 | Pedersen | G06F 3/017 |
| 2024/0273563 A1* | 8/2024 | Narayanan | G06Q 10/04 |
| 2024/0303273 A1* | 9/2024 | Singh | G06F 16/1734 |

\* cited by examiner

| Device ID | Device Type | Application/ Process | Coordinate (X) | Coordinate (Y) | Full Screen | Control Handle | Stream ID | Step |
|---|---|---|---|---|---|---|---|---|
| 101 | Mouse | EXCEL.EXE | 151 | 48 | Y | HWND_EX_INS_ MENU | 1 | 1 |
| 101 | Mouse | EXCEL.EXE | 231 | 113 | Y | HBTN_EX_ICONS | 1 | 2 |
| 102 | Mouse | EXCEL.EXE | 26 | 47 | Y | HWND_EX_FL_M ENU | 2 | 1 |
| 102 | Mouse | EXCEL.EXE | 67 | 225 | Y | HBTH_EX_PRINT | 2 | 2 |

FIG. 4

```
from numpy import array
from keras.models import Sequential
from keras.layers import LSTM
from keras.layers import Dense
from keras.layers import RepeatVector
from keras.layers import TimeDistributed
from keras.utils.vis_utils import plot_model
from tensorflow.keras.layers import Input, LSTM, RepeatVector
from tensorflow.keras.models import Model
import pandas as pd
import numpy as np
import matplotlib.pyplot as plt
import seaborn as sns
```

FIG. 6

```
# reading the historical data file into pandas dataframe
activities_df = pd.read_csv("input_device_activities.csv") # Read the historical input device activities data
```

`activities_df.head()`

| | device_id | device_type | process | coord_x | coord_y | full_screen | control_handle | stream_id | step |
|---|---|---|---|---|---|---|---|---|---|
| 0 | 101 | mouse | EXCEL.EXE | 151 | 48 | Y | HWND_EX_INS_MENU | 1 | 1 |
| 1 | 101 | mouse | EXCEL.EXE | 231 | 100 | Y | HBTN_EX_ICONS | 1 | 2 |
| 2 | 102 | mouse | EXCEL.EXE | 26 | 47 | Y | HWND_EX_FL_MENU | 2 | 1 |
| 3 | 102 | mouse | EXCEL.EXE | 67 | 225 | Y | HBTN_EX_PRINT | 2 | 2 |
| 4 | 123 | keyboard | POWERPNT.EXE | 37 | 82 | Y | HWND_PWPT_FL_MENU | 3 | 1 |

FIG. 7

```
# Encode the categorical values by using Label Encoding
from sklearn.preprocessing import LabelEncoder activities_df['device_type'] = LabelEncoder().fit_transform(activities_df['device_type'])
activities_df['process'] = LabelEncoder().fit_transform(activities_df['process'])
activities_df['full_screen'] = LabelEncoder().fit_transform(activities_df['full_screen'])
activities_df['control_handle'] = LabelEncoder().fit_transform(activities_df['control_handle'])

activities_df.head()
```

|   | device_id | device_type | process | coord_x | coord_y | full_screen | control_handle | stream_id | step |
|---|-----------|-------------|---------|---------|---------|-------------|----------------|-----------|------|
| 0 | 101 | 1 | 0 | 151 | 48  | 0 | 5 | 1 | 1 |
| 1 | 101 | 1 | 0 | 231 | 100 | 0 | 0 | 1 | 2 |
| 2 | 102 | 1 | 0 | 26  | 47  | 0 | 4 | 2 | 1 |
| 3 | 102 | 1 | 1 | 67  | 225 | 0 | 1 | 2 | 2 |
| 4 | 123 | 0 | 1 | 37  | 83  | 0 | 6 | 3 | 1 |

FIG. 8

```
input_data = activities_df.to_numpy()

timesteps = 1
input_dim = 9 latent_dim = input_dim // 2
```

FIG. 9

```
# define the LSTM encoder
encoder_inputs = Input(shape=input_shape)
encoder = LSTM(latent_dim, activation='relu', return_state=True)
_, state_h, state_c = encoder(encoder_inputs)
encoder_states = [state_h, state_c]

# define the LSTM decoder
decoder_inputs = Input(shape=(None, input_dim))
decoder_lstm = LSTM(latent_dim, activation='relu', return_sequences=True, return_state=True)
decoder_outputs, _, _ = decoder_lstm(decoder_inputs, initial_state=encoder_states)

# define the output layer
output_layer = TimeDistributed(Dense(input_dim, activation='softmax'))
decoder_outputs = output_layer(decoder_outputs)
```

FIG. 10

```
# define the model
model = Model([encoder_inputs, decoder_inputs], decoder_outputs)

# compile the model
model.compile(optimizer='adam', loss='categorical_crossentropy')

batch_size = 50
epochs = 200
# train the model on the historical actions data
model.fit([input_data, input_data], input_data,
          batch_size=batch_size,
          epochs=epochs,
          validation_split=0.2)
```

```
# use the trained encoder to predict the next action based on the current action
encoder_model = Model(encoder_inputs, encoder_states)

decoder_state_input_h = Input(shape=(latent_dim,))
decoder_state_input_c = Input(shape=(latent_dim,))
decoder_states_inputs = [decoder_state_input_h, decoder_state_input_c]
decoder_outputs, state_h, state_c = decoder_lstm(decoder_inputs, initial_state=decoder_states_inputs)
decoder_states = [state_h, state_c]
decoder_outputs = output_layer(decoder_outputs)
decoder_model = Model([decoder_inputs] + decoder_states_inputs, [decoder_outputs] + decoder_states)
```

FIG. 12

```
def predict_next_action(current_action):
    # encode the current action
    current_action = np.reshape(current_action, (1, timesteps, input_dim))
    states_value = encoder_model.predict(current_action)

# generate the next action
    target_seq = np.zeros((1, 1, input_dim))
    next_action = None
    while next_action is None:
        output_tokens, h, c = decoder_model.predict([target_seq] + states_value)
        next_action = output_tokens[0][-1]
        states_value = [h, c]
        target_seq[0][0] = next_action
    return next_action
```

FIG. 13

SMART INPUT DEVICES WITH USER BEHAVIOR PREDICTIONS

FIELD OF THE INVENTION

Embodiments of the present invention generally relate to computing system input devices. More particularly, at least some embodiments of the invention relate to systems, hardware, software, computer-readable media, and methods, for predicting user behavior regarding the use of computing system input devices.

BACKGROUND

Input devices are the unsung heroes of computing systems. They are a key element in facilitating human interaction with computer systems by keying, scanning, recording, pointing, touching, and various other modes. There are many classes of input devices, and they can be found in all computing devices. Some of the popular input devices in use today including pointing devices such as mouse, trackball, light pen, touch pad, touch screen, and stylus, as well as gaming input devices such as joysticks and gamepads, and text/character input devices such as keyboards, and barcode readers. Notwithstanding their ubiquity, these devices have remained fundamentally the same in terms of being point-and-click or touch-and-move devices.

Typically, the use of any input device, including a mouse, trackpad, or joystick, for example, involves moving a physical device on a plane to simulate and/or cause a corresponding movement of a pointer or other indicator on a screen. While the overall approach is sufficient in some circumstances, this approach nonetheless requires constant movement of the pointer or other indicator on the screen to reach clickable, that is, selectable, controls, buttons, menus, sub menus and dialog boxes hidden inside these menus. Thus, a typical user spends a considerable amount of time moving the mouse or other input device and clicking controls on screen to express their intent.

In more detail, to reach specific features within applications and programs, a user must constantly move or otherwise manipulate the input devices to reach specific menu items, click submenus, and access dialogs. Programs such as MS Office tried to solve this problem by building menus, but even that approach involves hunting for specific items, moving the mouse to point to those items and clicking them. Further, discoverability of program features and application features are typically baked into applications. Finally, typical input devices are simply unsophisticated devices that do no more than what is specifically directed by the user, in effect, they are simply a digital pair of hands at the command of the user.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 4 discloses an example clickstream dataset.

FIG. 6 discloses example code for generation of a data frame according to one embodiment.

FIG. 7 discloses an example dataset before encoding of text values to numeric values, according to one embodiment.

FIG. 8 discloses example code for encoding text values, and an example dataset after encoding of text values to numeric values, according to one embodiment.

FIG. 9 discloses example code for obtaining a data array from a dataframe, according to one embodiment.

FIG. 10 discloses example code for building a neural network, according to one embodiment.

FIG. 11 discloses example code for a model compile and training process, according to one embodiment.

FIG. 12 discloses example code for requesting a model to generate a prediction, according to an embodiment.

FIG. 13 discloses example code for generating a prediction, according to an embodiment.

DETAILED DESCRIPTION OF SOME EXAMPLE EMBODIMENTS

Figure 1:
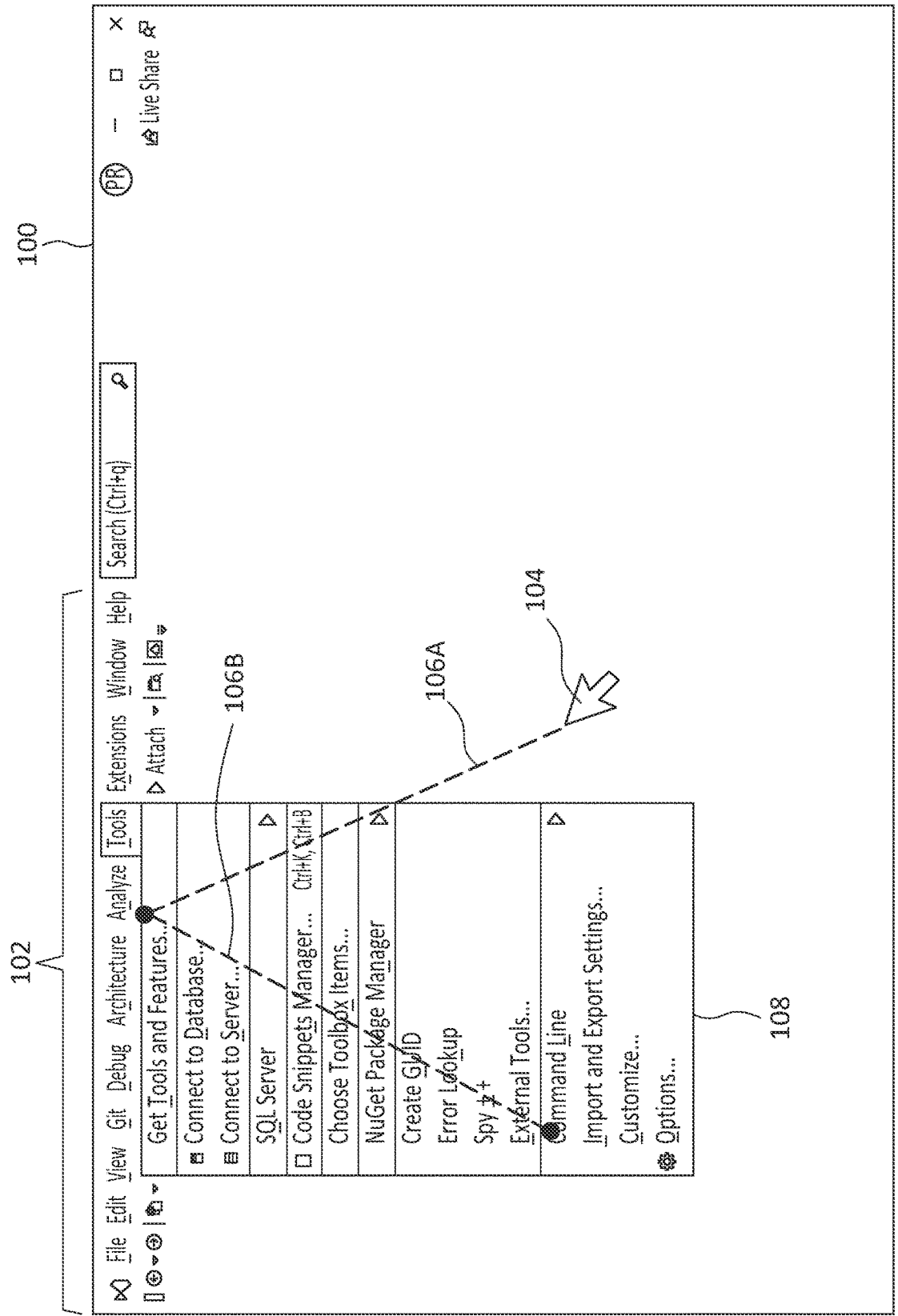
FIG. 1 discloses aspects of an example display and movement of a pointer of an input device.

Embodiments of the present invention generally relate to computing system input devices. More particularly, at least some embodiments of the invention relate to systems, hardware, software, computer-readable media, and methods, for predicting user behavior regarding the use of computing system input devices.

In general, one example embodiment of the invention is directed to a method that is able to predict the intent of a user with regard, for example, to a menu selection or other action, before the beginning of a movement, or other manipulation, of the input device to make the selection. The method may be implemented in various forms such as, but not limited to, hard-coded into a base application, such as a word processing application for example, that requires the use of an input device, as a smart input device, as a plug-in to an application, as a system level application automatically invoked by any application or operation requiring the use of an input device, or as an enterprise-level application similarly or identically invoked.

In more detail, an example embodiment may capture the clickstream of a user, and the clickstream may then be stored, such as in a cloud storage environment for example. Data and metadata in the clickstream may be used to train an ML (machine learning) model. By learning the usage patterns of a user, the ML model may generate predictions as to one or more actions that may be expected to be of interest to a user. While the user is using an input device, one or more of the predicted actions may be presented to the user for possible selection. Some of the predictions may be context sensitive so that, for example, a prediction made for a word processing application would not be presented to a user while that user was using a spreadsheet application. Other predictions may be broadly applicable across multiple applications.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that predicted input operations may be presented to a user of an input device for possible selection and, when selected by the user, enable more rapid and effective navigation by the user within an application, or applications. An embodiment of the invention may reduce the number of input device operations required by a user when the user is using an application. Various other advantages of one or more example embodiments will be apparent from this disclosure.

A. Overview

An embodiment of the invention comprises a predictive and intelligent framework that is able to capture and manage a user clickstream, and then use data and/or metadata of the user clickstream to predict a next best action of the user, such as a human user, in an automated manner when the user is using an input device. Input devices within the scope of the invention include, but are not limited to, mouse, trackball, light pen, touch pad, touch screen, and stylus, as well as gaming input devices such as joysticks and gamepads, and text/character input devices such as keyboards, and barcode readers, game controllers and other controllers, and any other devices that enable a user to interact with any type of computing system.

Example embodiments of the invention may take various forms including, but not limited to, a base application with hard-coded predictive functionality, a smart input device that implements, or facilitates the implementation of, the predictive functionality, an application plug-in with predictive functionality, a system level application automatically invoked by instantiation of any application, or operation, requiring the use of an input device, and an enterprise-level application similarly or identically invoked. Regardless of the implementation form, the predictive functionality of an embodiment may be automatically invoked by events such as, but not limited to, instantiation of an application, or manipulation of an input device by a user. Following are some example functionalities that may be implemented by one or more embodiments of the invention.

A.1 Learning User Behaviors in Various Applications

While working in an application, based on a selection made by the user with an input device, such as a mouse click on a menu option for example, the clickstream generated by operation of the input device may be captured for learning and analysis for prediction. A clickstream may, or may not, be specific to any one, or more, of, a particular application, a group of applications, a user, a timeframe, or a computing device, for example.

For example, if a user opens Visual Studio and click on 'Tools Menu' followed by clicking on an 'Options Menu,' both the application executable name, and the "Handles" to the menu items, may be captured in a clickstream, along with coordinates in a pixel map or other coordinate system, of various positions that a pointer or other indicator of an input device traversed while moving to those menus. A 'handle' may comprise, for example, a unique name/ID for each control used by the OS (operating system) and may be available in programming frameworks and languages.

With attention now to FIG. 1, an illustrative example is provided. As shown there, a display 100 presents a menu 102 that comprises various options selectable by a user with an input device. In particular, the user may manipulate the input device to move a pointer 104, whose movement is controlled by, and corresponds to, manipulation of the input device such as by movement of the input device, to various locations within the display 100, including to items of the menu 102. In this example, the user has moved the pointer 104 to the 'Tools' menu option and taken the action of selecting 'Tools.' This movement of the pointer 104 is shown by the broken line 106A. As a result of that selection by the user, a drop down menu 108 is displayed, and the user has taken the next action of selecting the 'Options' option of the drop down menu 108. The movement of the pointer 104 from the 'Tools' menu option to the 'Options' option is shown by the broken line 106B.

In the example of FIG. 1, a clickstream, which may be generated/modified and stored in real time as the user manipulates the input device to take various actions, may comprise various data and metadata about the pointer 104 movement and the corresponding user selections. In particular, and with continued reference to the illustrative example of FIG. 1, the clickstream in this example may indicate information and data/metadata such as, but not limited to, [1] the initial position of the pointer 104 on the display 100 when the application was opened, [2] any movements of the pointer 104 prior to the time that the 'Tools' option is selected, [3] the path, and travel time, of the pointer 104 from its initial position to the 'Tools' option, [4] the path, and travel time, of the pointer 104 from the 'Tools' option to the 'Options' option, [5] the locations, on a pixel map or other coordinate reference system, of the pointer 104, [6] the selection(s) made with the pointer 104 and the actions resulting from those selections, and [7] the sequence of movements of the pointer 104. Various other examples of clickstream data and metadata are disclosed elsewhere herein.

A.2 Managing a Clickstream of a User

During the use of an input device while a user is working with one or more applications, the clickstream of the user may be sent, possibly in real time while the user is using the input device, to a clickstream repository server and stored and managed in a for future analysis and training. In an embodiment, the clickstream metadata may include the user information (identity), application name, clickstream coordinates (that captures the move and click) of menu, and other, options used by the user in the application, along with the date(s) of use. These, and/or other clickstream data and metadata, may be used to train an ML (machine learning) model to learn the specific behavior of the user, and to then predict the next best movement/action based on the current position and movement as identified from the pixel coordinates. Put another way, the ML model may, after having been trained on user clickstream information, be able to anticipate input device operations by a user and present the anticipated operations to the user in a user-selectable manner.

Note that a user is not required to exit an application, and then re-open the application, in order to make use of predictions relating to that application. Rather, in one embodiment, and within a single session during which the user is using an application, a clickstream may be generated, a prediction may be made based on that clickstream, and the user may accept that prediction. That is, a prediction may be generated inline as the user is working. As well, a prediction may be generated and stored offline, that is, while the user is not using the application, for later presentation to a user.

A.3 Local Behavior Prediction

Figure 2:
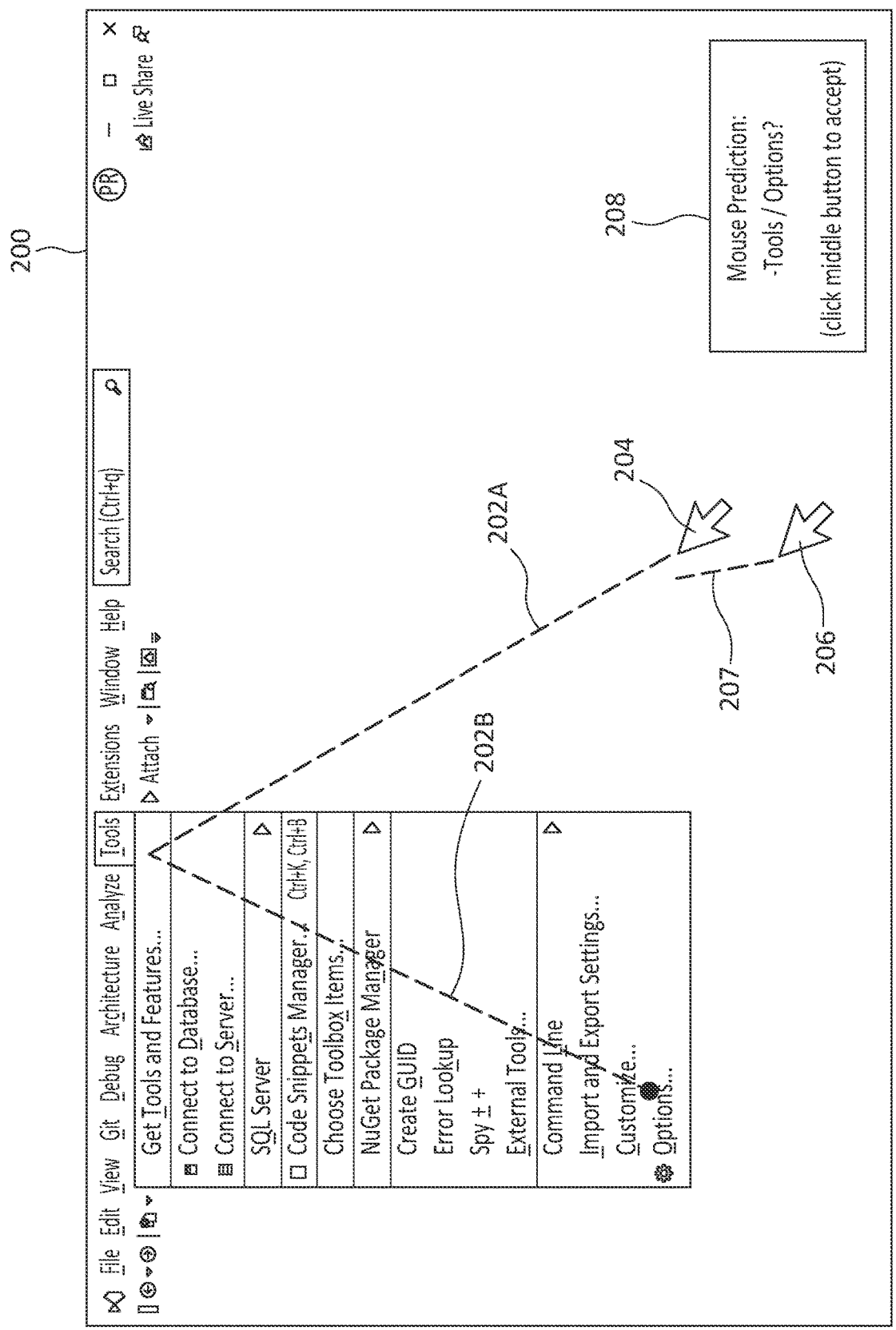
FIG. 2 discloses aspects of a predicted operation of an input device, and corresponding pointer movement.

With reference now to FIG. 2, an example is provided of historical, and predicted, user input device operations, where the predicted operations are predicted based on the historical operations. In particular, a display 200 is disclosed that presents an application for use by a user. In this example, the historical path 202A/B of a pointer 204 can be seen. This historical path 202A/B indicates a previous route taken by a pointer of an input device that was moved by a user as the user was using the application. For the sake of illustration, the path 202A/B is the same as that shown in the example of FIG. 1. That is, the user previously manipulated an input device to select 'Tools' and then 'Options.

In an embodiment, information about the path 202A/B, and the selections made along that path 202A/B, may be stored in a metadata repository, and then used to train a prediction engine of an ML model, an example of which is discussed in more detail below. The next time that the user opens the application and navigates to the portion of the application shown on the display 200, the ML model may recognize the path, and any selections, taken during that navigation. Based on this recognition, the ML model may either retrieve, or automatically generate, and present to the user, one or more recommended application operations.

In the example of FIG. 2, the pointer 204 shows the historical path 202A/B and user actions taken along that path 202A/B. When the user next arrives at the screen shown in FIG. 2 and begins to move the pointer 206 along the portion 207 of a path, the ML model may recognize that, as the user manipulates the input device to move the pointer 206 to the end of the portion 207 of the path, the location and direction of movement of the pointer 206 are similar, or possibly identical, to the historical location and direction of movement of the pointer 204. Based on this similarity or identity, the ML model may generate a recommendation to the user. In this example, the recommendation 'Mouse Prediction:—Tools/Options?' may be generated, since the 'Tools' and 'Options' were previously selected by the user with the pointer 204.

In an embodiment, and as shown in FIG. 2, the recommendation(s) of the ML model may be presented in a pop-up menu 208, and the user may accept the recommendation, and implement the recommended action, simply by manipulating the input device, such as by clicking a middle button of a mouse for example. That is, by simply accepting the recommendation, the user need not navigate the pointer 206 to 'Tools' and then to 'Options'-rather, those selections may be made automatically when the user accepts the recommendation. Thus, the user has eliminated two mouse operations in this example. Also, because the selections are made automatically, the chance for user error in making those selections is eliminated.

B. Detailed Description of Aspects of an Example Embodiment

One example embodiment of the invention comprises an intelligent framework that operates to capture, learn and predict user behavior with respect to each application while working on various input devices. For example, while using a mouse working on a specific application, such as a spreadsheet program or slide presentation program for example, pointer movements, clicks, and other operations relating to the manipulation of an input device, may be captured as part of a clickstream and passed to a computing device. In conventional usage, this clickstream metadata is usually captured and passed to the OS of the computing device for processing the action, but no intelligence or insights are derived from this clickstream for future action.

In contrast, an example embodiment of the invention may employ the clickstream to make predictions as to future user actions. This functionality may be implemented through the use of a framework comprising various components to [1] manage the clickstream metadata and [2] predict a next, or other subsequent, action of activity on an input device. In an embodiment, and with reference now to the example architecture 300 disclosed in FIG. 3, these components may comprise a clickstream metadata management repository 302, or simply 'metadata repository,' and a smart next click action prediction engine 304, or simply a 'prediction engine.'

Figure 3:
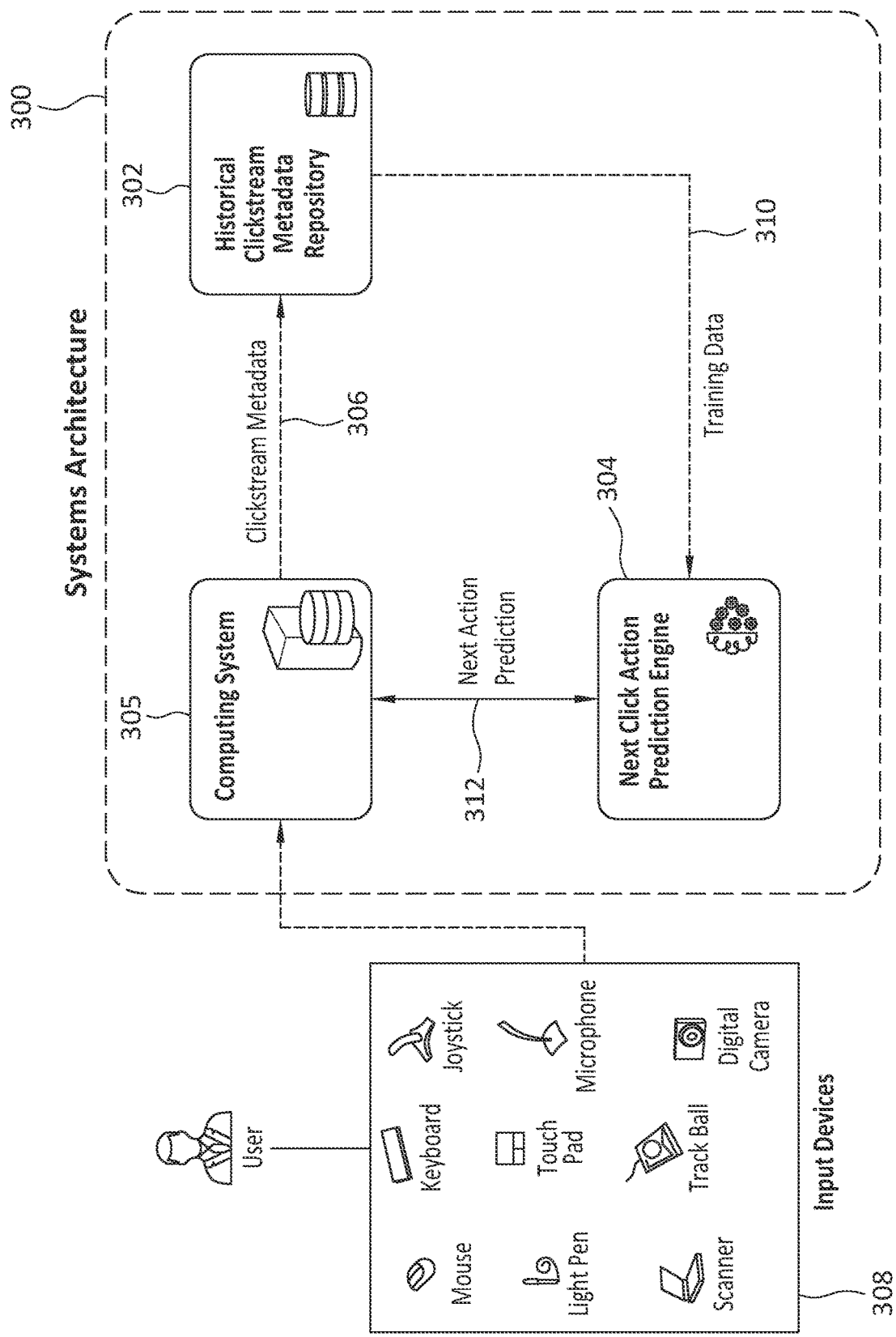
FIG. 3 discloses an example architecture according to one embodiment.

In an embodiment, historical clickstream metadata may be the best indicator for predicting, with high accuracy, what would be the next action of the user for a specific application using a specific input device. Thus, an embodiment comprises a metadata repository 302 that receives, from a user computing system 305, the clickstream metadata 306 of the user for all applications and all types of input devices 308 from computing system(s) 305 in a centralized repository. The clickstream metadata may include, for example, input device identifier (ID), type of input device, the application with which the input device is being used, the coordinates of the pointer (both X and Y), control handle, clickstream id and the step number in that clickstream. As shown in FIG. 3, the clickstream information may be provided to the prediction engine 304 as training data 310, and at least some of the clickstream information may then be used by the prediction engine 304 to generate a next, or other subsequent, action 312 that may then be presented to the user, for possible selection by the user, by the computing system j305.

B.1 Metadata Repository

In an embodiment of the invention, data engineering and data pre-processing of the clickstream may be performed early to enable an understanding of the features and the data elements that will be influencing the predictions for the next step or action in the user behavior based on the current step of action as defined by the clickstream action. This analysis may include, for example, multivariate plots and a correlation heatmap to identify the significance of each feature in the dataset so that un-important, that is, uninfluential, data elements may be filtered out. This may be important to reduce the dimension and complexity of model, hence improving in the accuracy and performance. The metadata repository 302 may contain important information about the clickstream metadata of the user while working on a specific application using a specific input device. All this information may be useful in training the ML model of the prediction engine 304 for accurate predictions of a next, or other subsequent, action. Some example data elements that may be stored in the metadata repository 302 and used for training the ML model of the prediction engine 304 are disclosed in the table 400 of FIG. 4. These data elements, whose types are identified in the heading 402 of the table 400, are provided only by way of illustration, and are not intended to limit the scope of the invention in any way.

B.2 Prediction Engine

B.2.1 Structure and Operation

The prediction engine, an example of which is denoted at 304, is operable to predict, with high degree of accuracy, the next, or other subsequent, action in a sequence of actions, based on the historical sequence of events of clickstream. The prediction of future actions from current actions using historical actions data may be referred to herein as a 'sequence model' and the prediction engine may comprise an ML model, or algorithm, to implement a sequence model. In general, the sequence models is configured to work with sequences of input data, such as a sequence of actions taken by a user using an input device. A sequency model may be trained on historical action data, and then used to predict the next, or other subsequent, action in the sequence, given a current action.

DNN (deep neural network)-based algorithms such as RNN (Recurrent Neural Network) and LSTM (Long Short-Term Memory) may be particularly well suited for implementing the prediction task because they are able to model the temporal dependencies between actions in the sequence. This means that the NN may take into account the order in which the actions occurred, which may be important for predicting future actions based on past actions. Thus, an embodiment of the invention comprises an LSTM network, implemented in an embodiment of the prediction engine 304, that may trained in an unsupervised manner to learn the underlying patterns and relationships between actions in the historical actions data of one or more clickstreams. The LSTM network may then be used to predict the next action in the sequence based on the current action, without being explicitly trained on a labeled dataset of actions.

An example embodiment of the invention employs an LSTM network in an unsupervised manner, by implementing an autoencoder architecture. In an embodiment, the autoencoder may be used to learn a representation/feature (encoding) for a set of data, sometimes for dimensionality reduction of the data that is input to the autoencoder. In general, an autoencoder training process may comprise receiving an input set of data, encoding the data, and then decoding the encoded data. By performing this process one or more times, the autoencoder is able to learn the relationships in the data.

Thus, when the autoencoder receives no data for which it has not been trained, the autoencoder can process the new data to identify anomalies, remove noise, and/or other functions with respect to the new data. In an embodiment, the operation of an autoencoder may reduce the dimensionality of the input data set.

In more detail, along with the reduction side, a reconstructing side of the autoencoder is learned in which the autoencoder tries to generate, from the reduced encoded data, a representation of the data that is as close as possible to the original input. That is, an autoencoder may receive input data parameters such as, but not limited to, application, device id, device type, X and Y coordinates, clickstream, and action event id, and by performing an encoding process, followed by a decoding process, may learn the correlation between these parameters and thereby learn a user click pattern.

Figure 5:
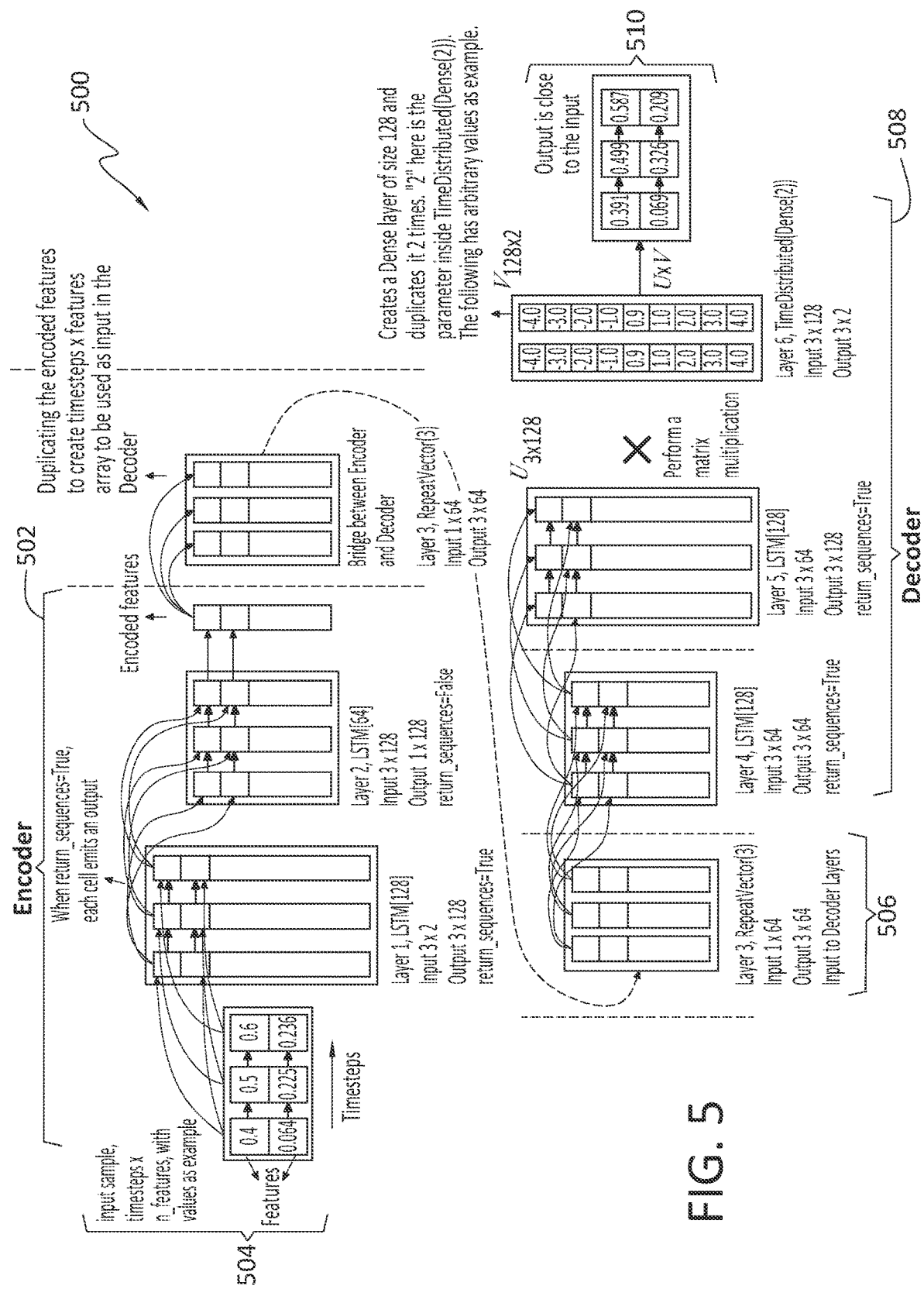
FIG. 5 discloses an example autoencoder according to one embodiment.

Architecturally, an autoencoder according to an embodiment, such as the example autoencoder 500 disclosed in FIG. 5, may comprise a basic form of feed-forward neural networks referred to as ANN (artificial neural network) or MLP (multi-layer perceptron. An autoencoder 500 may comprise an input layer, an output layer and one or more hidden layers in between the input layer and the output layer. In an embodiment, the output layer may have the same number of nodes as the input layer. In this approach, the LSTM network using autoencoder may be trained to reconstruct its input sequence 504, such as a sequence of input data parameters, from a compressed or encoded representation 506, or "code" of the sequence. The LSTM network may be used, as part of an encoder 502, to encode the input sequence into a compressed representation, and then another LSTM network may be used, as part of a decoder 508, to decode the compressed representation 506 back into an output 510 comprising the original sequence, or a sequence substantially similar to the original sequence or input 504. Thus, an autoencoder 500 according to one embodiment of the invention may comprise two different LSTM networks.

During training, the autoencoder 500 may be optimized to minimize the difference between the original input sequence 504 and the reconstructed sequence 510. After training, the encoder part 502 of the network may be used as a predictor of the next action in the sequence-based on the current action.

B.2.2 Implementation

Following is a discussion of a process for implementing a prediction engine according to one example embodiment. This is provided by way of example and is not intended to limit the scope of the invention in any way. In general, the implementation of a prediction engine may be performed by using Keras with Tensorflow backend, Python language, Pandas, Numpy, and ScikitLearn libraries. These components are provided by way of example, and not limitation.

B.2.2.1 Data pre-processing

In one example embodiment, the data/metadata in a historical clickstream activities data file may be read and a Pandas data frame generated, as indicated by the example code 600 disclosed in FIG. 6. The data frame, an example of which is identified at 700 in FIG. 7, may comprise all the columns that are the features for training. Since an embodiment may employ an unsupervised learning approach, the data frame may not include a 'target' column. The initial operation may be to conduct pre-processing of data to handle any null or missing values in the columns. Null/missing values in numerical columns may be replaced by the median value of the values in that column. After performing an initial data analysis by creating some univariate and bivariate plots of these columns, the importance and influence of the data in each column may be understood. Columns that have no role or influence on the actual prediction, that is prediction of a next or other subsequent action of a user, may be dropped.

B.2.2.2 Text Encoding

As ML models deal with numerical values, textual categorical values in the columns may be encoded, such as by way of the example code 800 disclosed in FIG. 8, during this stage. For example, categorical values (see table 700) such as 'device type,' 'process,' 'coord . . . ,' 'full_screen,' and 'control_handle' may be encoded. This encoding may be achieved by using LabelEncoder from ScikitLearn library which is shown at 800. The results of an example encoding process are indicated in the table 802 of FIG. 8, in which the aforementioned categorical values have been encoded as textual values.

In an embodiment, the input data may be built as a Numpy array which may be obtained from the dataframe using the code 900 disclosed in FIG. 9. As well, an embodiment may set the timstep in the sequence and the input dimension, that is, the number of columns, which is '9' in the sample data shown in the tables 700 and 800. The latent dimension value may be set with the number of dimension that the autoencoder compresses. Thus, in an embodiment, the latent dimension value may be set to 50% of the input dimension '9.'

B.2.2.3 Neural Network Model Creation

In an embodiment, an autoencoder with LSTM based encoder and decoder layer may be created using Keras library. For example, a neural network may be built using the Keras functional model, and separate encoder and decoder networks may be created and added to the functional model. Example code 1000 to build the neural network is disclosed in FIG. 10.

In an embodiment, an ML model of a prediction engine may use "adam" as the optimizer and the "categorical_crossentropy" as the loss function. The encoder network of this ML model may be trained with the training data. Example code 1100 for the model compile and training is disclosed in FIG. 11.

After the ML model of the prediction engine is trained, it may be directed to predict a future action by passing the current action to the predict( ) of the model shown. Example code 1200 and 1300 for these operations is shown in FIGS. 12 and 13, respectively.

C. Further Discussion

As apparent from this disclosure, an embodiment of the invention may possess various useful features and aspects, although these are not required to form an element of any embodiment(s). The following examples are illustrative of such features and aspects.

An embodiment may implement predictive capabilities of the next best action(s) and clicks to input devices by learning from past actions and movements by leveraging sophisticated Machine Learning models. This enablement of the capabilities of the input devices to learn from the user over a period, practically removes the need for the user to even move the device fully to achieve most tasks, thereby improving the speed and productivity of the user in performing common tasks, and other tasks.

D. Example Methods

Figure 14:
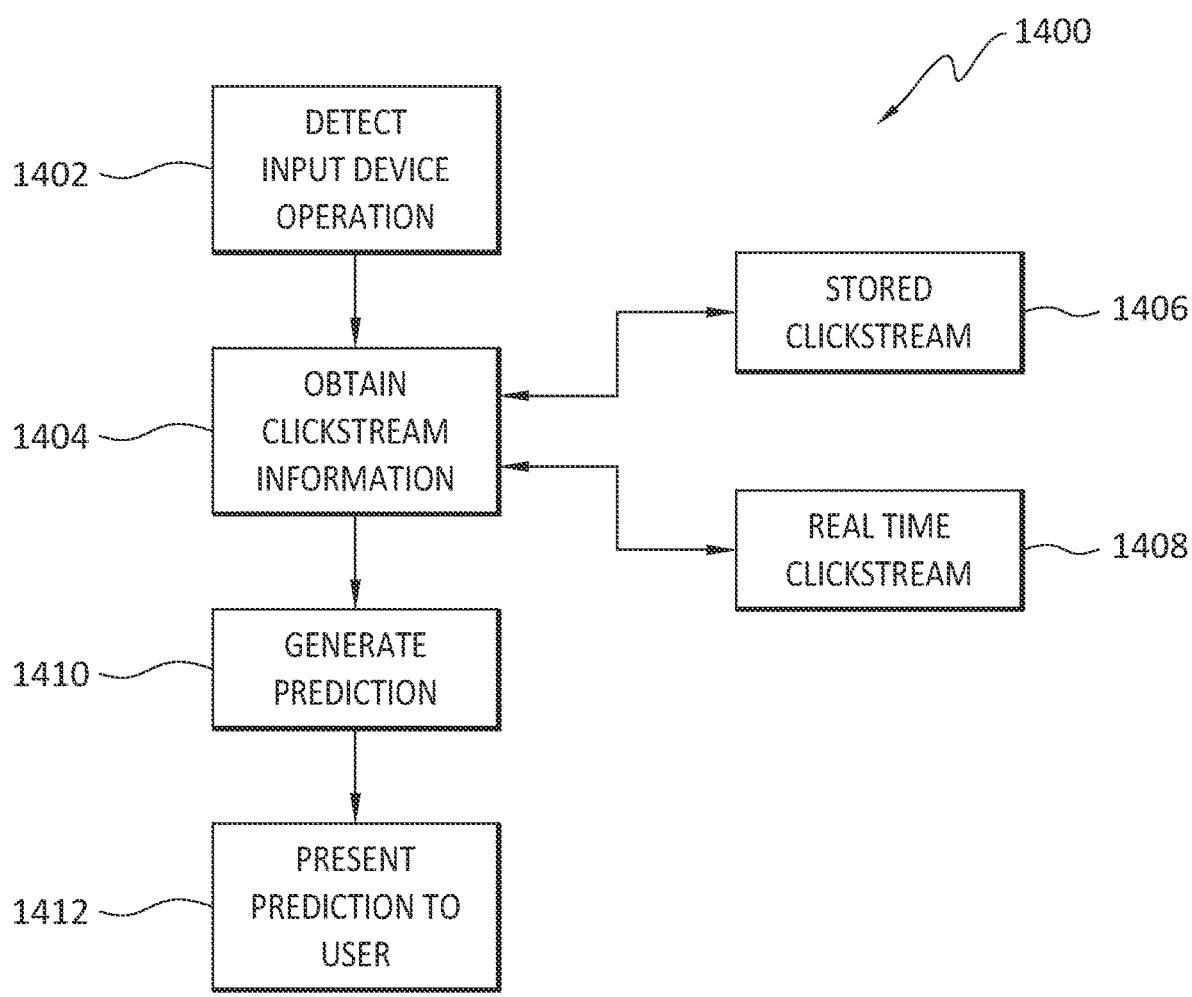
FIG. 14 discloses a method according to one example embodiment.

It is noted with respect to the disclosed methods, including the example method of FIG. 14, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 14, a method according to one example embodiment is indicated at 1400. In an embodiment, the method 1400 may be performed in whole or in part by a prediction engine. Parts of the method 1400 may be performed offline while a user is not using an input device, and/or parts of the method 1400 may be performed online while the user is manipulating an input device. In an embodiment, the entire method 1400 may be performed online.

The example method 1400 may begin with detection 1402 of an input device operation, which may result from user manipulation of the input device. Such an operation may include, but is not limited to, movement of a pointer, on a display for example, corresponding to the input device.

In response to the detection 1402, clickstream information, which may comprise data and/or metadata for example, may be obtained 1404. The clickstream information may be obtained from storage 1406, such as a metadata repository, and/or clickstream information may be obtained in real time 1408 as a user is manipulating an input device.

The clickstream information that has been obtained 1404 may then be used as a basis to generate a prediction 1410. The prediction 1410 may comprise a prediction as to a next action of the user. Finally, the prediction may be presented 1412 to the user for possible selection by the user. Note that the user is not necessarily compelled to select the prediction, and may instead simply continue to manipulate the input device. In an embodiment, the predictions may be turned off so that they are not presented to the user. This may be done when, for example, the user is performing a single selection, or other simple operation, that may not realize a benefit from the use of a predicted movement.

E. Further Example Embodiments

Following are some further example embodiments of the invention. These are presented only by way of example and are not intended to limit the scope of the invention in any way.

Embodiment 1. A method, comprising: detecting an operation of an input device; obtaining a clickstream associated with a user; using information from the clickstream, generating a prediction as to a next action by the user using the input device; and presenting the prediction to the user for possible selection by the user.

Embodiment 2. The method as recited in claim 1, wherein the prediction is generated using an autoencoder of a machine learning model.

Embodiment 3. The method as recited in claim 1, wherein the information of the clickstream comprises any one or more of an identity of the user, identification of an application used by the user, and clickstream coordinates corresponding to one or more movements of a pointer associated with the input device.

Embodiment 4. The method as recited in claim 1, wherein the information from the clickstream is obtained in real time as the user is manipulating the input device.

Embodiment 5. The method as recited in claim 1, wherein the information from the clickstream is obtained from a metadata repository.

Embodiment 6. The method as recited in claim 1, wherein the information from the clickstream comprises historical information associated with the user.

Embodiment 7. The method as recited in claim 1, wherein after the user selects the prediction, one or more input device selections associated with that prediction are automatically made without requiring further action by the user.

Embodiment 8. The method as recited in claim 1, wherein the prediction is generated by a machine learning model that was trained using historical information comprising a history of input device operations performed by the user.

Embodiment 9. The method as recited in claim 1, wherein the prediction is generated based on a particular sequence in which events in the information from the clickstream occurred.

Embodiment 10. The method as recited in claim 1, wherein the input device comprises any of a mouse, trackball, light pen, touch pad, touch screen, and stylus, gaming input device, joystick, gamepad, text/character input device, keyboard, barcode reader, game controller, or any other device that enables the user to interact with any type of computing system.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 15:
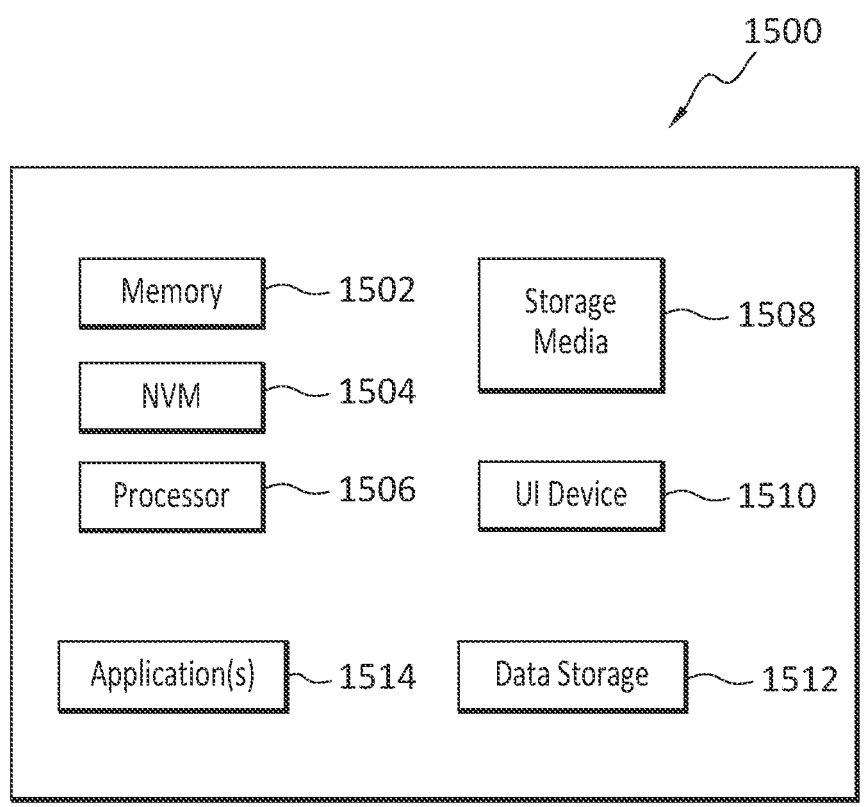
FIG. 15 discloses an example computing entity configured and operable to perform any of the disclosed methods, processes, and operations.

With reference briefly now to FIG. 15, any one or more of the entities disclosed, or implied, by FIGS. 1-14, and/or elsewhere herein, may take the form of, or include, or be implemented on, or hosted by, a physical computing device, one example of which is denoted at 1500. As well, where any of the aforementioned elements comprise or consist of a virtual machine (VM), that VM may constitute a virtualization of any combination of the physical components disclosed in FIG. 15.

In the example of FIG. 15, the physical computing device 1500 includes a memory 1502 which may include one, some, or all, of random access memory (RAM), non-volatile memory (NVM) 1504 such as NVRAM for example, read-only memory (ROM), and persistent memory, one or more hardware processors 1506, non-transitory storage media 1508, UI (user input) device 1510, and data storage 1512. One or more of the memory components 1502 of the physical computing device 1500 may take the form of solid state device (SSD) storage. As well, one or more applications 1514 may be provided that comprise instructions executable by one or more hardware processors 1506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   detecting within an application an operation of an input device;
   obtaining a clickstream associated with the operation of the input device;
   using metadata from the clickstream and history information of previous clickstreams and corresponding metadata, the clickstream and/or the history information comprising a path, taken by a pointer of the input device, on a display;
   generating a prediction as to a next action of the application to be performed by the input device; and
   presenting the prediction to a user for possible selection by the user,
   wherein the metadata of the clickstream comprises any one or more of an identity of the input device, identification of the application used by the user, and clickstream coordinates corresponding to one or more movements of a pointer associated with the input device, and
   wherein the prediction comprises acceptance information informing how to accept the prediction without moving the pointer to another coordinate.

2. The method as recited in claim 1, wherein the prediction is generated using an autoencoder of a machine learning model.

3. The method as recited in claim 1, wherein the information from the clickstream is obtained in real time as the user is manipulating the input device.

4. The method as recited in claim 1, wherein the information from the clickstream is obtained from a metadata repository.

5. The method as recited in claim 1, wherein the information from the clickstream comprises historical information associated with the user.

6. The method as recited in claim 1, wherein after the user selects the prediction, one or more input device selections associated with that prediction are automatically made without requiring further action by the user.

7. The method as recited in claim 1, wherein the prediction is generated by a machine learning model that was trained using historical information comprising a history of input device operations performed by the user.

8. The method as recited in claim 1, wherein the prediction is generated based on a particular sequence in which events in the information from the clickstream occurred.

9. The method as recited in claim 1, wherein the input device comprises any device that can provide the pointer and enable the user to interact with any type of computing system by using the pointer.

10. A non-transitory storage medium having stored therein instructions that are executable by one or more hardware processors to perform operations comprising:
    detecting within an application an operation of an input device;
    obtaining a clickstream associated with the operation of the input device;
    using metadata from the clickstream and history information of previous clickstreams and corresponding metadata, the clickstream and/or the history information comprising a path, taken by a pointer of the input device, on a display;
    generating a prediction as to a next action of the application to be performed by the input device; and
    presenting the prediction to a user for possible selection by the user,
    wherein the metadata of the clickstream comprises any one or more of an identity of the input device, identification of the application used by the user, and clickstream coordinates corresponding to one or more movements of a pointer associated with the input device, and
    wherein the prediction comprises acceptance information informing how to accept the prediction without moving the pointer to another coordinate.

11. The non-transitory storage medium as recited in claim 10, wherein the prediction is generated using an autoencoder of a machine learning model.

12. The non-transitory storage medium as recited in claim 10, wherein the information from the clickstream is obtained in real time as the user is manipulating the input device.

13. The non-transitory storage medium as recited in claim 10, wherein the information from the clickstream is obtained from a metadata repository.

14. The non-transitory storage medium as recited in claim 10, wherein the information from the clickstream comprises historical information associated with the user.

15. The non-transitory storage medium as recited in claim 10, wherein after the user selects the prediction, one or more input device selections associated with that prediction are automatically made without requiring further action by the user.

16. The non-transitory storage medium as recited in claim 10, wherein the prediction is generated by a machine learning model that was trained using historical information comprising a history of input device operations performed by the user.

17. The non-transitory storage medium as recited in claim 10, wherein the prediction is generated based on a particular sequence in which events in the information from the clickstream occurred.

18. The non-transitory storage medium as recited in claim 10, wherein the input device comprises any device that can provide the pointer and enable the user to interact with any type of computing system by using the pointer.

* * * * *